United States Patent [19]

Mann

[11] Patent Number: 4,727,238
[45] Date of Patent: Feb. 23, 1988

[54] WELDING GUN

[75] Inventor: Robert N. Mann, Mississauga, Canada

[73] Assignee: Bob Mann & Associates Inc., Mississauga, Canada

[21] Appl. No.: 899,308

[22] Filed: Aug. 22, 1986

[51] Int. Cl.$^4$ ............................. B23K 9/32; B23K 9/00
[52] U.S. Cl. ............................ 219/137.41; 219/137.31
[58] Field of Search ....................... 219/137.31, 137.41, 219/136.63, 137.2, 136, 137.43, 137.52

[56] References Cited

U.S. PATENT DOCUMENTS

| | | | |
|---|---|---|---|
| 3,536,888 | 10/1970 | Borneman | 219/137.43 |
| 3,909,586 | 9/1975 | Landis et al. | 219/137.43 |
| 4,496,823 | 1/1985 | Mann | 219/137.41 |

FOREIGN PATENT DOCUMENTS 3135381  3/1983  Fed. Rep. of Germany ...................... 219/137.41

Primary Examiner—E. A. Goldberg
Assistant Examiner—C. M. Sigda
Attorney, Agent, or Firm—Sim & McBurney

[57] ABSTRACT

A fume-extracting welding gun has an internal fume-extracting passage and comprises a handle member and a head member which have a normally-fixed angular position but which can be adjusted to another selected angular position. The head member has variable dimension passageways therethrough to the fume-extracting passageway to enable the vacuum applied at the welding site by the fume-extracting passageway to be varied by varying the flow of air through the passageways. The passageways are provided by openings in overlapping portions of a sleeve member and the head member and rotation of the sleeve member varies the passageway dimension.

9 Claims, 8 Drawing Figures

WELDING GUN

FIELD OF INVENTION

The present invention relates to welding guns, more especially to fume extracting welding guns.

BACKGROUND TO THE INVENTION

Arc welding operations are known to produce undesirable fumes during the welding process, many of them, such as certain oxides of nitrogen and carbon, being particularly noxious to the welder or others in the vicinity of the welding operation. Such fumes when allowed to accumulate in confined spaces have long been known to constitute a safety hazard, as well as an interference to welder visibility and general welding operation efficiency.

Fume extraction devices commonly have been employed to remove the fumes from the welding area to overcome the above-noted difficulties. Such devices comprise a dual conduit, with one conduit containing the conventional components of the welding apparatus and the other conduit providing a passageway for extraction of the undesirable fumes. The conduits may be formed concentrically.

In such concentric structures, the gun head is provided with an outer sleeve which is slidable axially of the head to alter the degree of suction applied to the welding site. This arrangement is not satisfactory, in that the outer sleeve often becomes detached, and then mislaid, so that the gun loses its effectiveness.

SUMMARY OF INVENTION

In accordance with the present invention, there is provided an improved fume extracting welding gun of the concentric passage type wherein the sleeve surrounding the welding tip is mounted for rotation relative to the head but is not normally permitted axial movement and a plurality of variable dimension openings is provided through the sleeve to vary the volume of air flowing into the interior of the sleeve through the openings and thereby to vary the degree of suction applied at the welding tip. By providing the sleeve in a rotatable non-axially movable form, accidental detachment and potential loss of the sleeve is eliminated.

BRIEF DESCRIPTION OF DRAWINGS

FIGS. 7 and 8 are sectional views of the on-off switch in its respective positions.

DESCRIPTION OF PREFERRED EMBODIMENT

Figure 1:
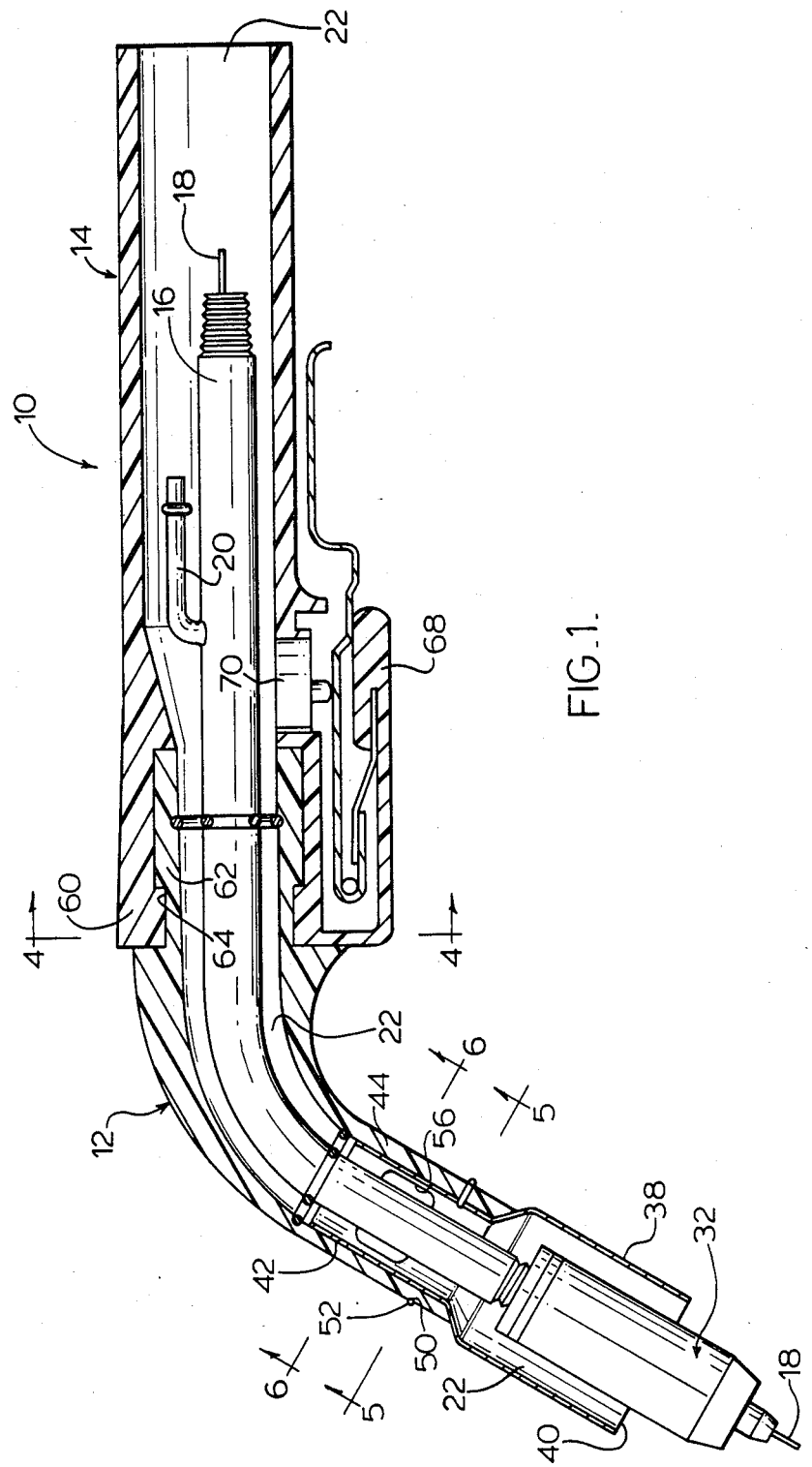
FIG. 1 is a longitudinal cross-sectional view of a welding gun constructed in accordance with a preferred embodiment of the invention.
Figure 2:
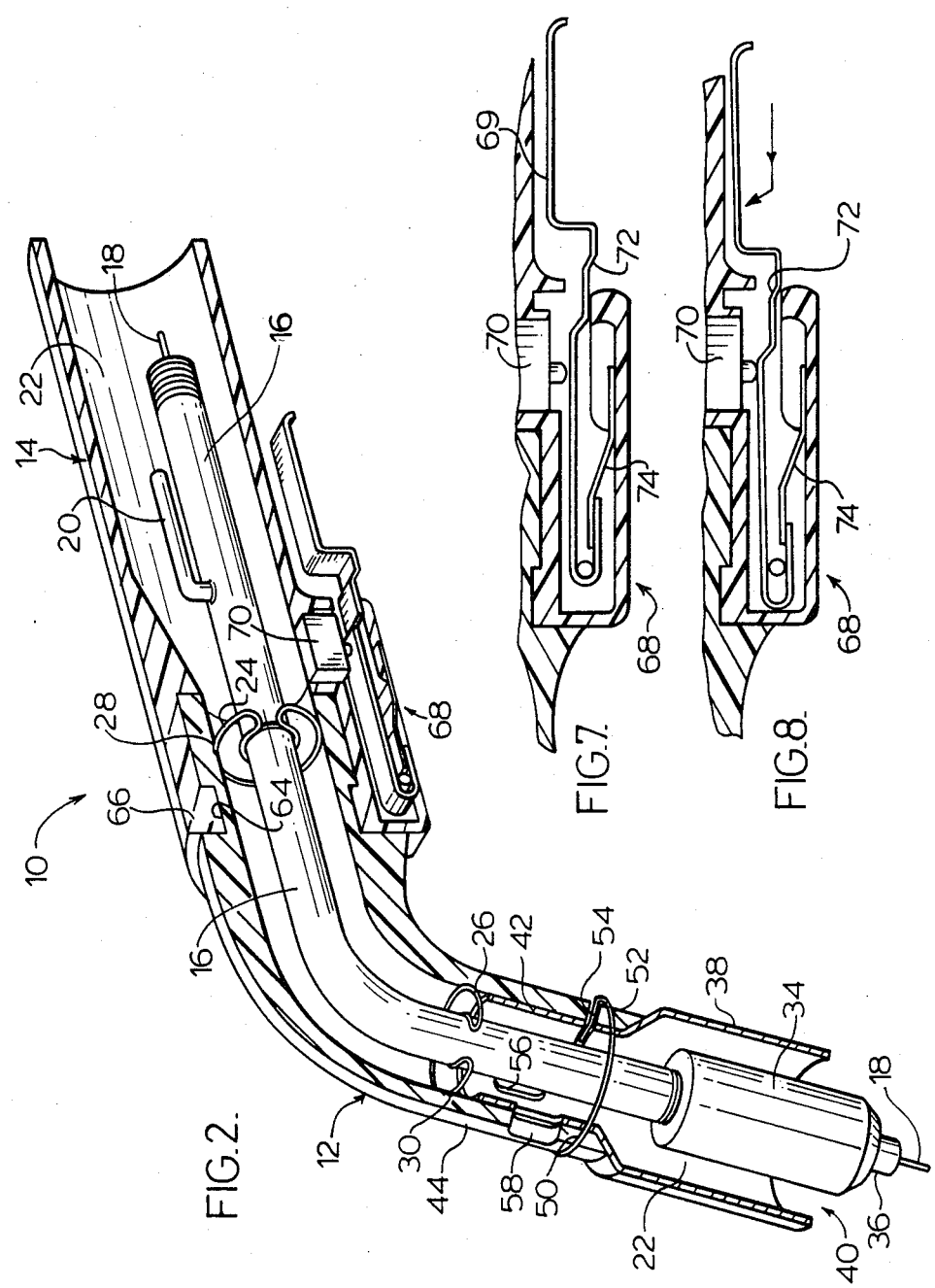
FIG. 2 is a perspective cross-sectional view of the welding gun of FIG. 1.

Referring to the drawings, a welding gun 10 comprises an angled head portion 12 and a rectilinear handle portion 14, which are joined to one another in variable position non-rotating relationship, as described below.

A gun tube conduit 16 extends centrally within the gun 10 and conveys welding wire 18 from a remote source to the welding site. An inert gas feed pipe 20 also communicates with the conduit 16 to provide a flow of shielding inert gas, such as carbon dioxide or argon, within the conduit 16 to surround the welding wire 18 at the welding site adjacent the exit from the head portion 12. A fume extracting passageway 22 is provided within the welding gun 10 for removal of fumes from the welding site under the influence of vacuum applied to the passageway 22, generally at a remote location. The conduit 16 is held in position within the fume extracting passageway 22 by spring clips 24 and 26, which are seated in respective grooves 28 and 30 formed in the internal wall of the passageway 22.

The conduit 16 terminates in a nozzle assembly 32 of any convenient construction but generally including an outer tubular member 34 surrounding an inner tubular member 36 through which the welding wire 18 projects. The annular space between the outer and inner tubular members 34 and 36 communicate with the interior of the conduit 16 to permit flow of the inert gas into space and thereby form a sheath of inert gas surrounding the welding wire 18 at the welding site to prevent oxidation.

Surrounding the nozzle assembly 32 is an elongate tubular member 38 which defines with the nozzle assembly 32, an annular opening 40 to the fume extraction passage 22. The elongate tubular member 38 has a decreased-diameter sleeve 42 which extends internally of and in sliding-fit relationship with a tubular member 44 of the angled head portion 12. The tubular member 44 has a slot 46 formed through the wall thereof normally in alignment with a similar slot 48 formed through the decreased-diameter sleeve 42 and also has an outer circumferential groove 50 in which is seated a spring clip member 52. The spring clip member 52 has an inwardly-bent portion or locking tab 54 projecting through the normally-aligned slots 46 and 48 to connect the elongate tubular member 38 to the remainder of the head portion 12.

The slot 48 formed in the decreased diameter sleeve 42 has a longer curvilinear dimension than that formed in the tubular member 44 to permit limited rotation of the elongate tubular member 38 relative to the head portion 12, while normally inhibiting relative longitudinal movement. However, forced rotation of the elongate tubular member 38 beyond its normal limit of rotation as the tab 54 engages the end of slot 48, causes the tab 54 to ride up onto the external surface of the sleeve 42, enabling the sleeve 42 to be slid longitudinally to permit removal of the elongate tubular member 38 from the remainder of the head portion 12, if desired.

Formed through the decreased diameter sleeve 42 and the tubular member 44 are circumferentially-spaced openings 56 and 58 respectively. The openings 56 and 58 are aligned at one normal extremity of rotation of the tubular member 38 relative to the head portion 12, so that the passageways formed by the aligned openings 56 and 58 and extending between the exterior of the head portion 12 and the fume extracting passageway 22 have their largest cross-sectional dimension and the greatest air flow therethrough to the fume extracting passageway 22. The openings 56 and 58 are completely out of alignment at the other normal extremity of rotation of the tubular member 38 relative to the head portion 12, so that the passageways formed by the openings 56 and 58 are closed and there is no air flow to the fume extracting passageway 22 therethrough. Between these extremities of relative rotation of tubular member 38, the flow of air to the fume extracting passageway 22 depends on the cross-sectional dimension of the aligned portions of the openings 56 and 58 as determined by the relative positions of the openings 56 and 58.

By varying the flow rate of air through these openings by relative positioning of the members 42 and 44, the degree of vacuum applied at the worksite through the annular opening 40 may be varied. As greater air flow is provided through the openings 56 and 58, less vacuum is applied at the worksite through the annular opening 40, while, similarly, as less air flow is provided through the openings 56 and 58, greater vacuum is applied at the worksite through the annular opening 40. In addition, since the openings 56 and 58 permit air to flow at ambient temperature into the passageway 22, this air may serve to cool the gases drawn from the welding site into the passageway 22 through annular opening 40 by the vacuum applied to passageway 22.

The tubular member 38 is securely fastened to the head 12 by the spring clip 52, so that the prior art problems associated with longitudinal sliding to achieve alteration in the degree of vacuum applied at the worksite are overcome and, in addition, a cooling effect not previously attainable results. As noted above, the tubular member 38 may be removed, if desired.

Figure 3:
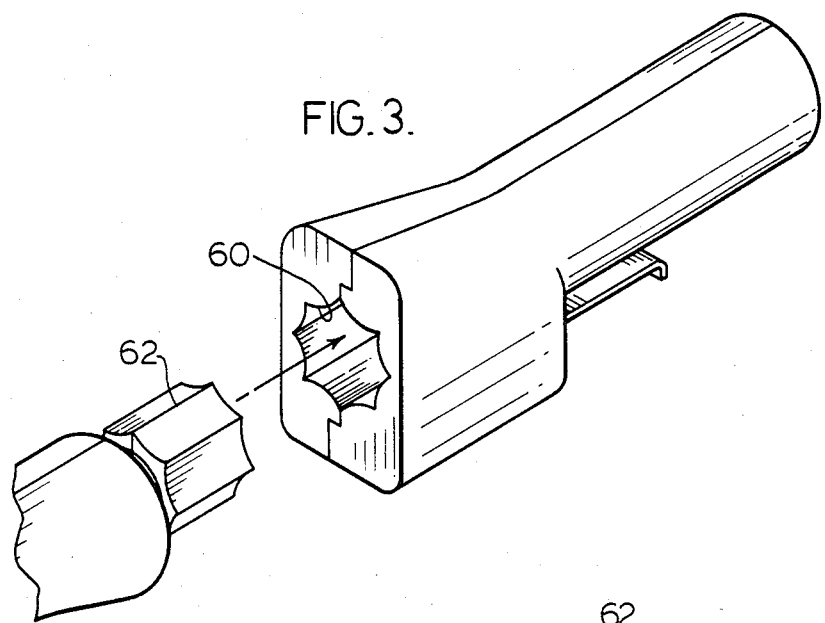
FIG. 3 is a detail perspective view showing assembly of portions of the gun of FIG. 1.
Figure 4:
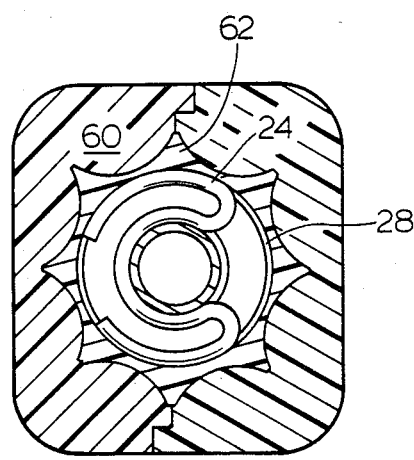
FIG. 4 is a sectional view taken on line 4—4 of FIG. 1.
Figure 5:
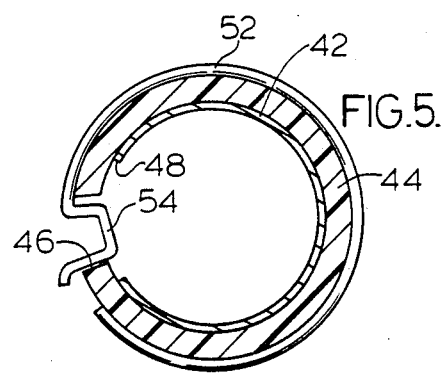
FIG. 5 is a sectional view taken on line 5—5 of FIG. 1.
Figure 6:
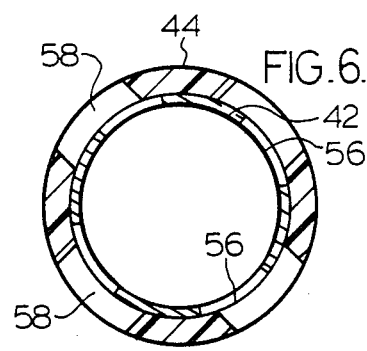
FIG. 6 is a sectional view taken on line 6—6 of FIG. 1.

The head portion 12 is connected to the handle portion 14 by overlapping sleeve portions 60 and 62 respectively which lock into each other by interaction of an annular portion 64 of the sleeve portion 60 projecting into a reduced diameter recess 66 of the sleeve portion 62 upon assembly of the elements together. The inner surface of sleeve portion 60 is scalloped and the outer surface of sleeve portion 62 is complimentarily-shaped, as seen in the detail view of FIG. 3 and the sectional view of FIG. 4, to permit positioning of the head portion 12 and the handle portion 14 relative to one another in a fixed selected angular relationship upon assembly. The angular relationship may be changed by disassembling the elements and rotating the head portion 12 and the handle portion 14 relative to one another until the desired relative orientation is achieved, whereupon the elements are reassembled.

The head portion 12 and the handle portion 14 are each formed of complimentarily-shaped halves which abut each other for assembly of both portions. Bolts extending through openings in the portions 60 and 62 then hold the assembled elements together.

A finger-operated trigger 68 is provided to initiate and stop feed of the wire 18 towards the worksite adjacent the member 32. The trigger 68 has an actuator 69 which is reciprocably slidable and engages a microswitch 70 mounted to the handle portion 14. As may be seen in FIGS. 7 and 8, the actuator 69 has a downwardly-stepped portion 72 which permits the actuator 69 to move to its "on" position when the trigger 68 is in its forward position (FIG. 8), while, when the switch actuator 69 is moved to its "off" position, the switch 70 no longer is engaged (FIG. 7). A spring 74 assists in biasing the lever 69 downwards, so that the feed of wire 18 can be temporarily initiated by pushing upward on the actuator 69 against the action of spring 74.

SUMMARY OF DISCLOSURE

In summary of this disclosure, the present invention provides a novel welding gun having improved construction. Modifications are possible within the scope of the invention.

What I claim is:

1. A welding gun, comprising:
   a hollow handle member and a hollow head member,
   a welding wire and inert gas-conveying conduit extending generally centrally within the hollow handle member and hollow head member to define a fume extracting passageway within the gun,
   said head member including a sleeve surrounding said conduit adjacent the downstream end thereof and defining therewith an inlet opening to said fume extracting passageway,
   said sleeve having a tubular portion being rotatably mounted relative to a tubular portion of said head member in overlapping relationship, and
   opening means formed in said sleeve tubular portion and opening means formed in said head member tubular portion positioned to define passageway means between the interior and exterior of the head member which is closed by rotation of said sleeve to one extreme position of rotation and which is opened to its maximum dimension by rotation of said sleeve to a second extreme position of rotation.

2. The welding gun of claim 1, wherein said head member is curved and said handle member and said head member are joined together in variable position non-rotating relationship.

3. The welding gun of claim 1, wherein said fume extracting passageway is generally annular and said conduit is maintained in said generally central position and also against longitudinal movement by longitudinally-spaced C-shaped clips engaging the conduit and the internal surface of the passageway.

4. The welding gun of claim 1, wherein said handle member comprises actuating switch means comprising a switch and a longitudinally slidable trigger arm shaped to activate and deactivate said switch in relative longitudinal locations of said trigger arm.

5. The welding gun of claim 1, wherein said sleeve tubular portion extends internally of said head member tubular portion in said overlapping relationship and normally is prevented from longitudinal movement in said position while permitting limited rotational movement between said extreme positions.

6. The welding gun of claim 5, wherein said longitudinal movement is inhibited and said limited rotational movement is permitted by a spring clip which surrounds and is seated in an outer surface of said head member tubular portion and includes a projection which extends through a slot formed through said head member tubular portion and also through an aligned slot in said sleeve tubular portion, the sleeve slot having ends and a length at least sufficient to permit said rotational movement between said extreme positions.

7. The welding gun of claim 6, wherein said projection is constructed, upon application of force thereto, to ride up the ends of the sleeve slot to engage the outersurface of said head member tubular portion to permit said sleeve to be removed from said head member.

8. The welding gun of claim 6, wherein said opening means in both said sleeve tubular portion and said head member tubular portion comprises four equally dimensioned openings located at equally arcuately-spaced locations.

9. The welding gun of claim 8, wherein said openings comprise aproximately one-half of the circumferential dimension of the tubular portions.

* * * * *